June 14, 1949.  S. P. CAMPBELL ET AL  2,473,006
FURNACE
Filed May 8, 1946  2 Sheets-Sheet 1
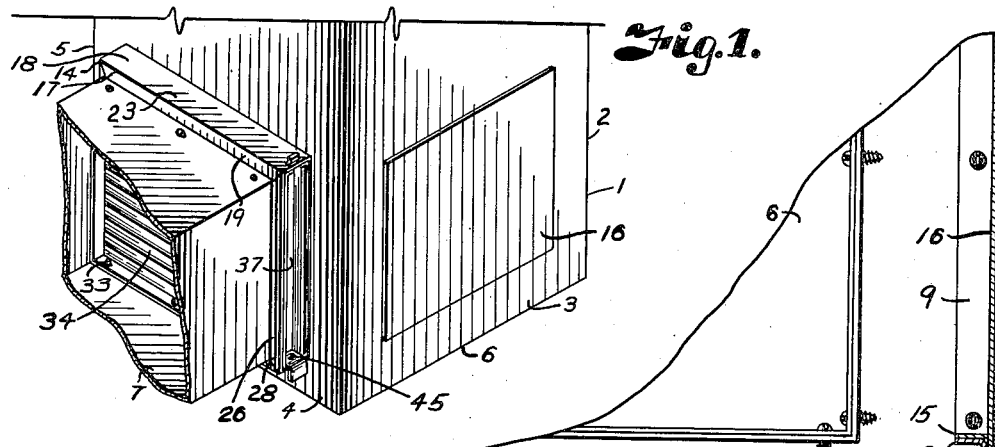
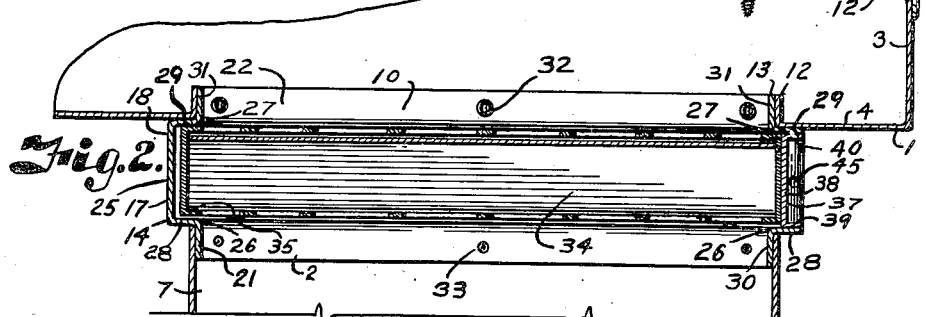
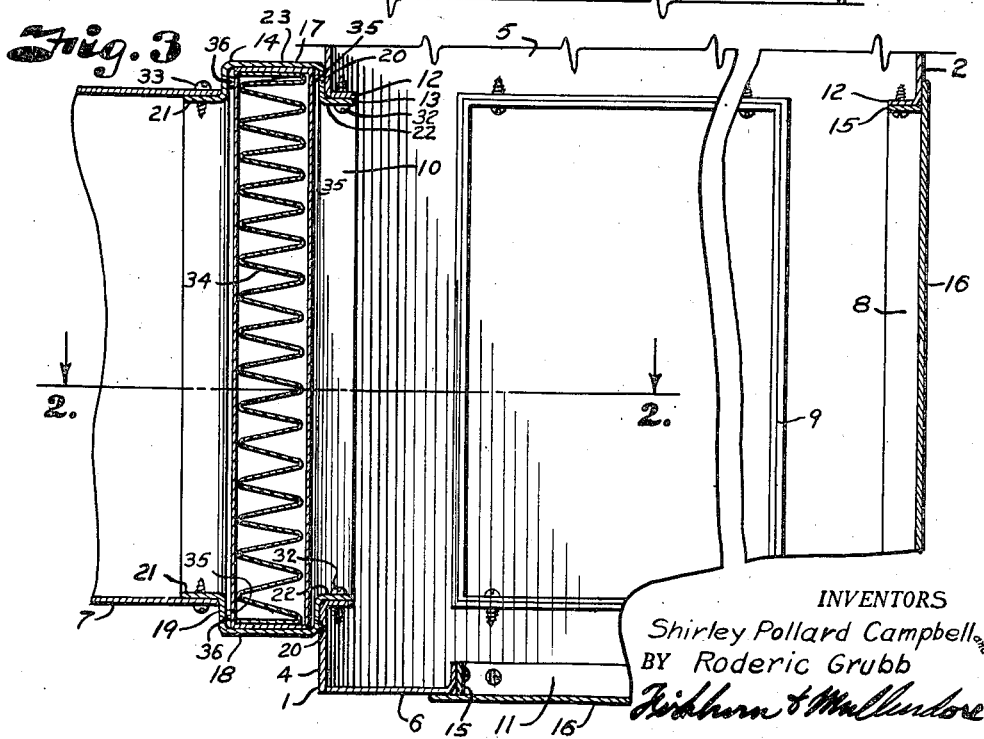
INVENTORS
Shirley Pollard Campbell
BY Roderic Grubb
ATTORNEYS

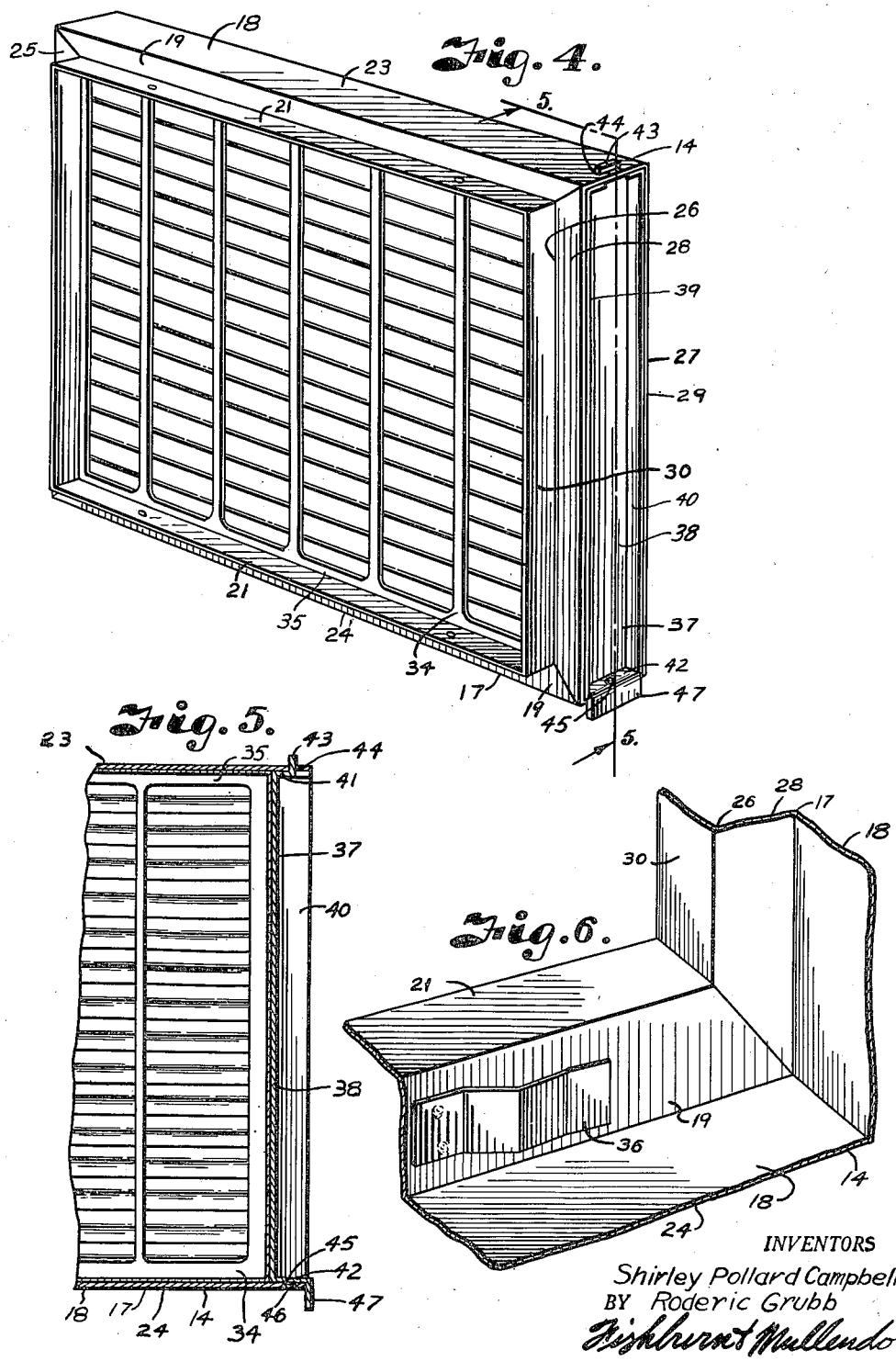

Patented June 14, 1949

2,473,006

UNITED STATES PATENT OFFICE 2,473,006

FURNACE

Shirley Pollard Campbell and Roderic Grubb, Wichita, Kans., assignors to The Coleman Company, Inc., Wichita, Kans., a corporation of Kansas Application May 8, 1946, Serial No. 668,125

4 Claims. (Cl. 183—44)

This invention relates to warm air furnaces and particularly the cold air return connections therefor.

The principal object of the invention is to provide a furnace structure and cold air return duct in association with a filter element whereby the return duct is adapted to be readily connected with the furnace casing in any given furnace installation.

Other objects of the invention are to provide a filter frame unit adapted for connecting the cold air duct with any one of a plurality of openings in the walls or bottom of the furnace; and to provide a structure which facilitates application and replacement of filter elements without requiring access through the interior of the furnace casing.

In accomplishing these and other objects of the invention, we have provided improved structure, the preferred form of which is illustrated in the accompanying drawing wherein:

Fig. 1 is a perspective view of the lower portion of a furnace and cold air return duct interconnected through a filter housing in accordance with the present invention.

Fig. 2 is an enlarged horizontal section on the line 2—2 of Fig. 3.

Fig. 3 is a vertical section.

Fig. 4 is a perspective view of the filter housing and filter contained therein.

Fig. 5 is a fragmentary section through the filter housing showing the door through which the filter element is inserted.

Fig. 6 is a perspective view of a portion of the filter housing showing one of the friction clips for retaining the filter element from movement in the housing and to maintain an even pressure on one face of the filter to eliminate leaks.

Referring more in detail to the drawings:

1 designates a furnace casing having side walls 2, 3, 4 and 5 and a bottom 6 to form an enclosure for a heating unit of any type.

In furnaces of this character, the upper portion of the casing is connected with a plenum chamber or warm air ducts leading to the space to be heated and cool air is returned to the furnace through a cold air return duct 7. The place of connection for the cold air duct 7 with the furnace varies with the individual installation of the furnace. For example, in some installations, it is desirable to connect the return duct with one of the side walls or with the bottom 6. The sides 2, 3 and 4 and bottom 6 are, therefore, provided with openings 8, 9 and 10 and 11 corresponding with the cross sectional shape of the duct. The sides of the furnace casing surrounding the opening are flanged inwardly as indicated at 12, Fig. 3, to be engaged by a corresponding flange 13 on the filter housing 14 or flange 15 on cover plates or panels 16. For example, if the duct 7 is to be connected with the opening 10 in the walls as shown in Fig. 2, the plates will cover the openings not being used for ducts. If the furnace is installed on the level with the space to be heated, the duct could best be connected with the bottom of the furnace and the plates or panels will be used to close the openings in the side walls of the casing.

The filter housing 14 is preferably formed of a substantially channel-shaped member 17 having a web 18 and side flanges 19 and 20 that terminate in outwardly extending flanges 21 and 22. The flanges 19 and 20 of the channel-shaped members are cut and the web 18 is bent to provide a substantially U-shaped frame having sides 23 and 24 connected at one end by a side 25. The opposite ends are connected by angle-shaped members 26 and 27 having flanges 28 and 29 positioned so that they extend in the plane of the flanges 19 and 20 and outwardly extending flanges 30 and 31 cooperating with the flanges 21 and 22 to sleeve within the opening to be used and which are secured to the inturned flanges around the marginal edge of the opening 10 by fastening devices such as screws 32. The flanges on the other side form a collar for receiving the end of the cold air duct 7 thereover and which is fixed thereto by fastening devices such as screws 33.

The space between the flanges 28 and 29 constitutes an opening through which a filter element 34 of any suitable type may be slid into the frame and retained with the marginal edges 35 thereof in seating contact with ways formed between the flanges 19 and 20 of the body portion of the frame and the flanges 28 and 29 of the angles 26 and 27.

The thickness of the filter element is such that it slides freely through the opening and when in position is retained in close contact with one or the other sides of the frame by spring clips 36 fixed to the inner face of the flanges at the opposite side of the frame.

In order to close the opening through which the filter is installed, we provide a door 37 comprising a plate 38 corresponding to the web portion of the frame and which has side and end flanges 39—40 and 41—42 that extend outwardly and engage the marginal surface of the frame surrounding the door opening as best shown in Figs. 1 and 4.

In order to removably retain the door, the upper flange has a lateral extending ear 43 bent from the flange thereof and which is adapted to fit within a slot 44 in the web of one of the rails to form a hinge, and the flange at the opposite end has a boss 45 adapted to engage within an opening 46 in the web of the other rail.

In order to facilitate disengagement of the boss from the opening, the flange at that end of the door terminates in a laterally extending ear 47 by which the door may be grasped to draw it outwardly to release engagement of the boss and permit dropping of the ear 43 from the opening on the opposite side of the frame.

In using the filter housing, it may be installed in any one of the openings of the furnace and the other openings covered by the plates or panels.

In installing the filter housing, the side flanges at one side are slid into the openings and secured to the surrounding flanges by the fastening devices 32. The duct is then connected with the flanges on the opposite side and secured by fastening devices. The filter element is then slid into the open end of the housing, after which the open end is closed by the door.

From the foregoing it is obvious that we have provided improved structure that is of simple construction and which permits location and connection of a return air duct in all furnace installations regardless of the floor level upon which the furnace is installed.

It is also obvious that when installed, the filter may be readily removed and replaced without disconnecting the duct from the furnace or without placing of the filter through an opening in a side of the furnace as in the case of present structures.

What we claim and desire to secure by Letters Patent is:

1. In a heating device, a casing having a cold air return opening surrounded by a lateral flange, a filter housing comprising a frame of channel cross section providing inwardly disposed side flanges terminating in lateral flanges at opposite sides of the filter housing with the lateral flange on one side of the filter housing engaging the flange surrounding the cold air return opening and the corresponding side flange of the housing overlapping the casing surrounding the return opening, fastening devices extending through said flanges, a cold air duct sleeved over the other lateral flange of the filter housing, fastening devices extending through the cold air duct and said last named flange to connect the cold air duct with the filter housing, said housing having a filter insert opening intermediate the side flanges at one side of the frame, a filter adapted for insertion through said opening and having marginal portions overlapping inner faces of said side flanges, and a closure for said insert opening.

2. In a heating device, a casing having a cold air return opening surrounded by a lateral flange, a filter housing comprising a frame of channel cross section providing inwardly disposed side flanges terminating in lateral flanges at opposite sides of the filter housing with the lateral flange on one side of the filter housing engaging the flange surrounding the cold air return opening and the corresponding side flange of the housing overlapping the casing surrounding the return opening, fastening devices extending through said flanges, a cold air duct sleeved over the other lateral flange of the filter housing, fastening devices extending through the cold air duct and said last named flange to connect the cold air duct with the filter housing, said housing having a filter insert opening intermediate the side flanges at one side of the frame, a filter adapted for insertion through said opening and having marginal portions overlapping inner faces of said side flanges, a closure for said insert opening, and means between said side flanges and one side of the filter for urging said marginal portions of the filter into sealing contact with said opposite side flanges.

3. In a heating device, a casing having a cold air return opening surrounded by a lateral flange, a filter housing comprising a frame of channel-shaped cross section providing inwardly disposed side flanges terminating in laterally projecting flanges at opposite sides of the filter housing, the lateral flange on one side of the filter housing being adapted to sleeve within said flange surrounding the cold air return opening with the corresponding side flange seating against the casing in surrounding relation with said opening, fastening devices extending through said flanges to retain said corresponding flange in said seating contact, a cold air duct sleeved over the other lateral flange of the filter housing, fastening devices extending through the cold air duct and said last named flange to connect the cold air duct with the filter housing, said housing having a filter insert opening intermediate said side flange at one side of the frame, a filter adapted for insertion through said opening and having marginal portions overlapping inner faces of said side flanges, and a closure for said insert opening.

4. In a heating device, a casing having a cold air return opening surrounded by a lateral flange, a filter housing comprising a frame of channel-shaped cross section providing inwardly disposed side flanges terminating in laterally projecting flanges at opposite sides of the filter housing, the lateral flange on one side of the filter housing being adapted to sleeve within said flange surrounding the cold air return opening with the corresponding side flange seating against the casing in surrounding relation with said opening, fastening devices extending through said flanges to retain said corresponding flange in said seating contact, a cold air duct sleeved over the other lateral flange of the filter housing, fastening devices extending through the cold air duct and said last named flange to connect the cold air duct with the filter housing, said housing having a filter insert opening intermediate said side flange at one side of the frame, a filter adapted for insertion through said opening and having marginal portions overlapping inner faces of said side flanges, a closure for said insert opening, and means between said side flanges and one side of the filter for urging said marginal portions of the other side of the filter against said opposite side flanges.

SHIRLEY POLLARD CAMPBELL.
RODERIC GRUBB.

REFERENCES CITED

The following references are of record in the file of this patent:

UNITED STATES PATENTS

| Number | Name | Date |
| --- | --- | --- |
| 764,922 | Davis | July 12, 1904 |
| 1,426,196 | Jordahl | Aug. 15, 1922 |
| 1,476,617 | Johnson | Dec. 4, 1923 |
| 1,515,839 | Connor | Nov. 18, 1924 |
| 2,214,750 | Myers | Sept. 17, 1940 |